(12) United States Patent
Merritt et al.

(10) Patent No.: US 8,445,778 B2
(45) Date of Patent: May 21, 2013

(54) CABLE ENTRY DEVICE FOR WIRING BOXES

(75) Inventors: Daniel Emerson Merritt, Apex, NC (US); Chandrakanthtrao Gireeshrao, Cary, NC (US); Jeffrey Francis Kane, Worcester, MA (US); Robert Alan Krosky, Raleigh, NC (US)

(73) Assignee: Sigma Electric Manufacturing Corporation, Garner, NC (US)

( * ) Notice: Subject to any disclaimer, the term of this patent is extended or adjusted under 35 U.S.C. 154(b) by 170 days.

(21) Appl. No.: 13/160,745

(22) Filed: Jun. 15, 2011

(65) Prior Publication Data

US 2011/0308832 A1 Dec. 22, 2011

Related U.S. Application Data

(60) Provisional application No. 61/355,396, filed on Jun. 16, 2010.

(51) Int. Cl.
*H02G 3/08* (2006.01)

(52) U.S. Cl.
USPC ............... 174/50; 174/58; 439/535; 248/906

(58) Field of Classification Search
USPC ....... 174/50, 58; 439/535; 248/906; 220/4.02
See application file for complete search history.

(56) References Cited

U.S. PATENT DOCUMENTS

| | | | | |
|---|---|---|---|---|
| 5,170,008 A * | 12/1992 | Evans et al. | ................... | 174/362 |
| 5,557,073 A * | 9/1996 | Truesdale et al. | ............. | 174/151 |
| 7,075,004 B1 * | 7/2006 | Gretz | ............... | 174/50 |
| 7,718,891 B2 * | 5/2010 | Adducci et al. | ................. | 174/50 |
| 7,880,084 B2 * | 2/2011 | Adducci et al. | ................. | 174/50 |
| 8,314,350 B1 * | 11/2012 | Gretz | ............... | 174/659 |
| 2009/0114413 A1 | 5/2009 | Daviau | | |
| 2009/0188916 A1 | 7/2009 | Daviau | | |

* cited by examiner

*Primary Examiner* — Dhirubhai R Patel
(74) *Attorney, Agent, or Firm* — Cantor Colburn LLP

(57) ABSTRACT

Disclosed herein are embodiments of a wiring box. The wiring box can include: a cavity formed by walls having an internal surface inside the cavity and an external surface; and a cable entry device disposed through a hole in a first wall of the walls. The cable entry device can include: a support element that retains a grommet in the hole, wherein the support element includes a stop, a grip extending from the stop, and shutters extending from the stop and defining an opening, wherein the opening converges away from the stop, the grip attaches the support element to the first wall, and wherein the grommet includes a rim, a sidewall extending from the rim and converging toward a diaphragm.

15 Claims, 11 Drawing Sheets

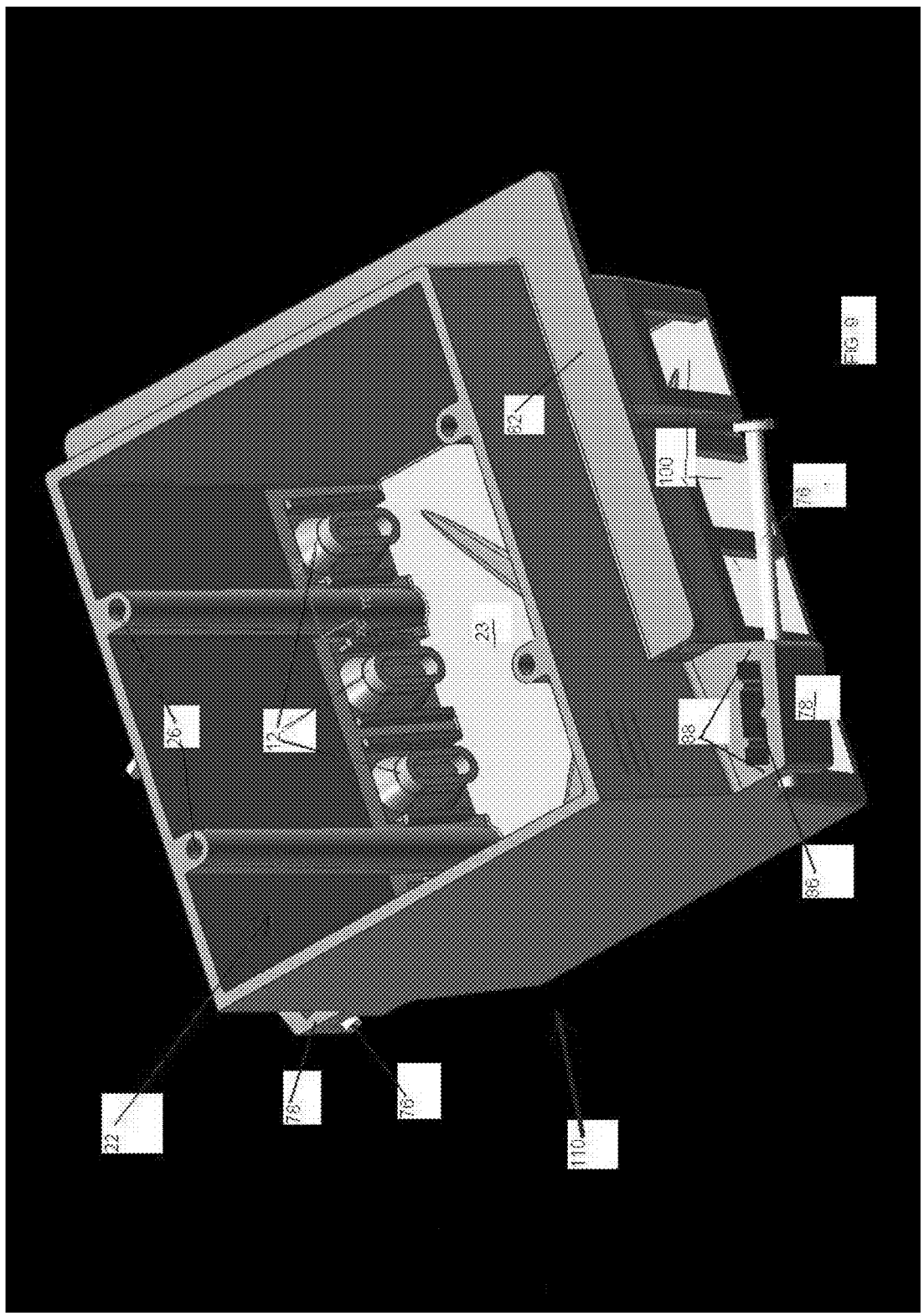

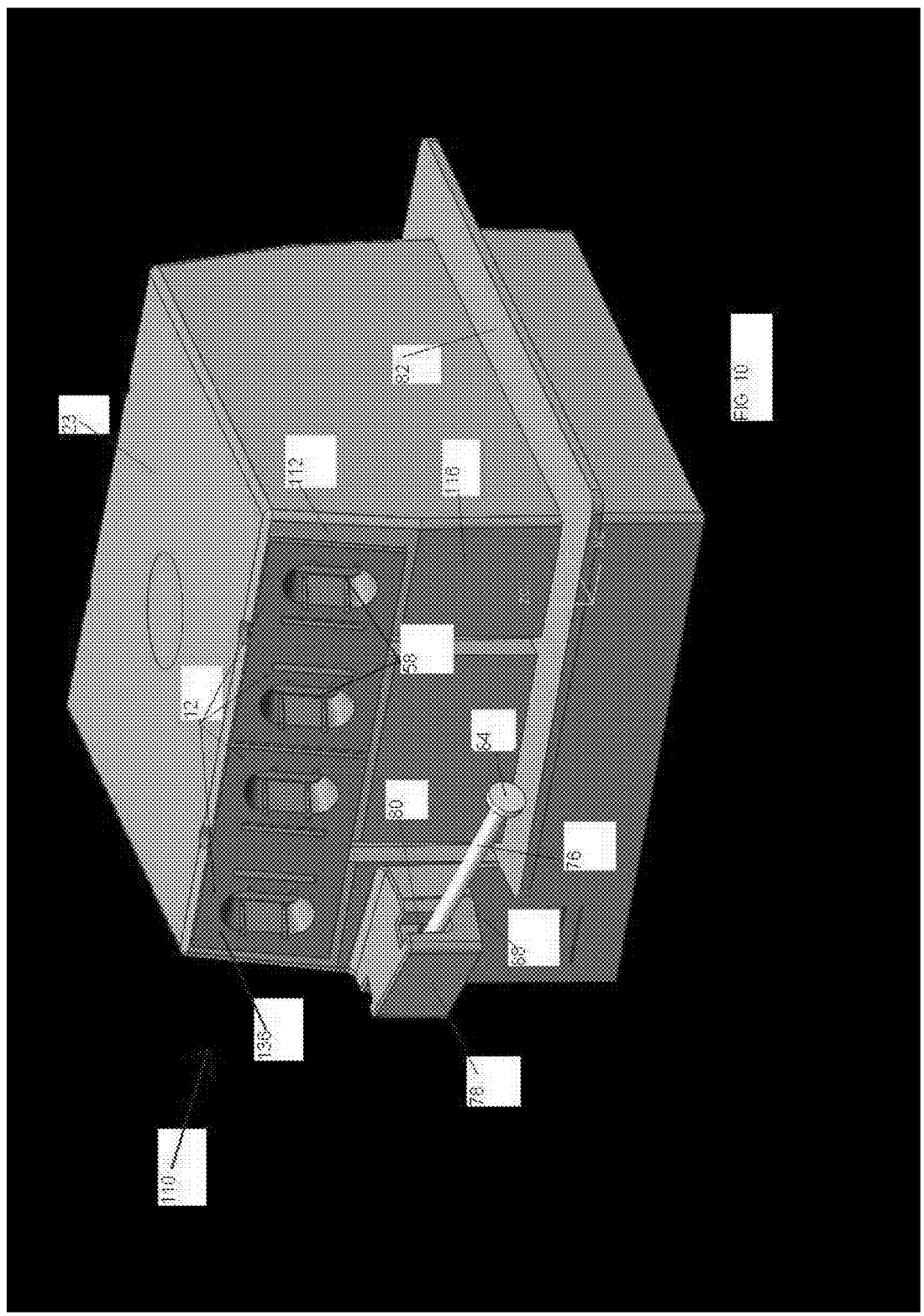

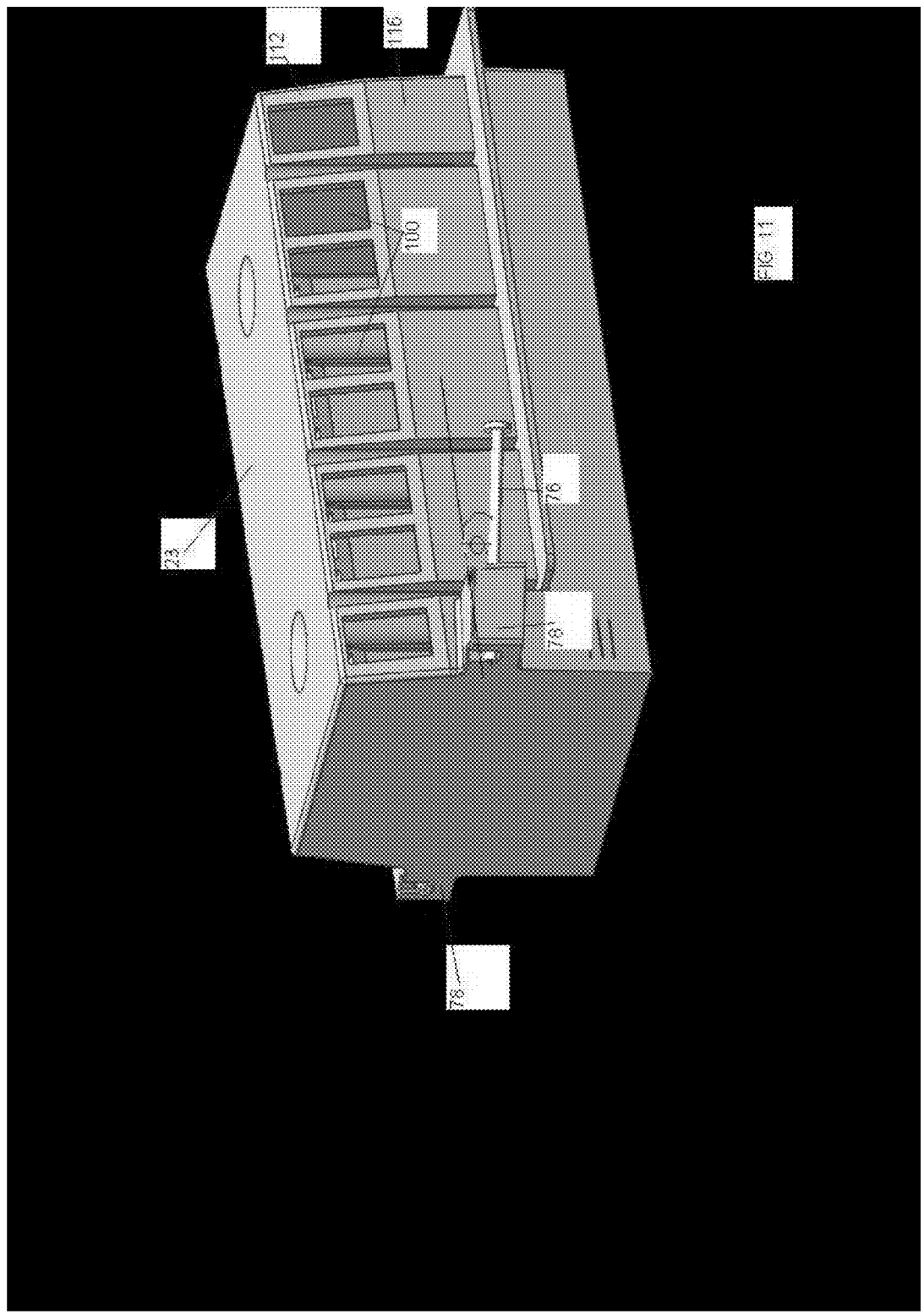

CABLE ENTRY DEVICE FOR WIRING BOXES

BACKGROUND

Wiring boxes currently provide a mounting for electrical outlets, electrical switches, computer network outlets, optical outlets, cable television outlets, and the like. The boxes are typically made of a hollow plastic or metal, and are polygonal (e.g., rectangular or square). These boxes typically insert into a drywall and can attach to a wall stud, and a box typically contains one or more holes for entry of a cable.

There have been many developments directed to improving the energy efficiency of commercial and residential developments including minimizing heat transfer and the infiltration and exfiltration of air into and out of wiring boxes. Examples of attempts to reduce airflow include an after market gasket available for attaching to the reverse side of the cover plate, insulation of the walls of a wiring box, utilizing foam around wires after the wiring has been passed into the box; a neoprene strip to cover around the holes of the box. Some of the issues faced by these designs, however include: once sealant is inserted into a box, the foam is difficult to work around when additional cables or components need to be changed out; failure to eliminate air flow adjacent to the wires entering through the box; reliance upon the discretion of the wiring installer in determining the size of perforations in the neoprene, leaving significant room for installer error; and/or the system is relatively labor intensive.

There remains a need for further improvements to mitigate air transfer at a point of connection between a cable and a hole in a wiring box, while providing for ease of manufacturing, installation, and effectiveness in accommodating cables of various sizes.

BRIEF SUMMARY

Disclosed herein are wiring boxes, cable entry devices, and methods of making and using the same.

In one embodiment, the wiring box can comprise: a cavity formed by walls having an internal surface inside the cavity and an external surface; and a cable entry device disposed through a hole in a first wall of the walls. The cable entry device can comprise: a support element that retains a grommet in the hole, wherein the support element comprises a stop, a grip extending from the stop, and shutters extending from the stop and defining an opening, wherein the opening converges away from the stop, the grip attaches the support element to the first wall, and wherein the grommet comprises a rim, a sidewall extending from the rim and converging toward a diaphragm.

In one embodiment, a cable entry device can comprise: a support element and a grommet. The support element can comprise a stop, a grip extending from the stop, and shutters extending from the stop and defining an opening, wherein the opening converges away from the stop. The grommet can comprise a sidewall extending from a rim and surrounding the shutters, wherein the sidewall converging toward a diaphragm.

The disclosure can be understood more readily by reference to the following detailed description of the various features of the disclosure and the examples included therein.

BRIEF DESCRIPTION OF THE DRAWINGS

Refer now to the figures (FIG.), which are exemplary embodiments, and wherein the like elements are numbered alike.

FIG. 9 is a front perspective view of an embodiment of the wiring box with multiple cable entry devices.

FIG. 10 is a side perspective view of the embodiment of the wiring box and cable entry devices of FIG. 9.

FIG. 11 is a perspective side view of another embodiment of the wiring box with multiple openings for cable entry devices.

DETAILED DESCRIPTION

Figure 1:
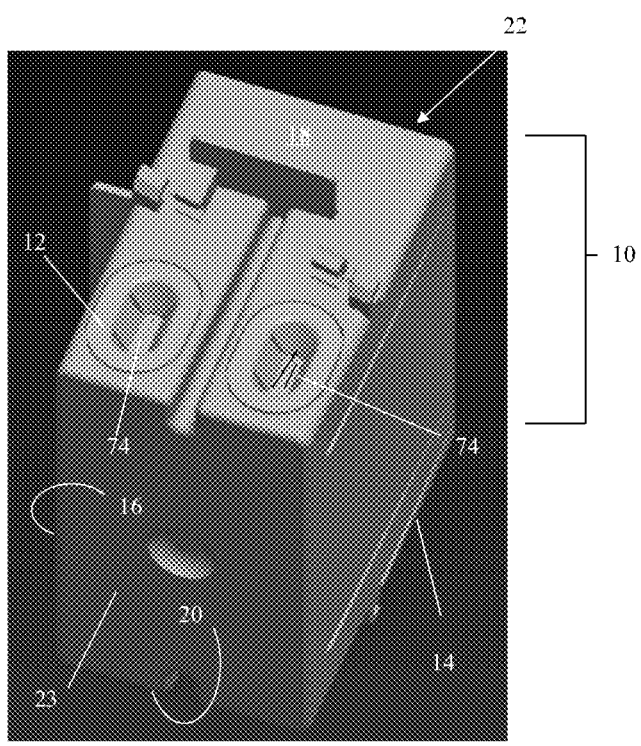
FIG. 1 is a top perspective view of an embodiment of the wiring box and cable entry device.

A cable entry device can minimize air transfer at a point of connection between a cable (e.g., cable, wire, conductor, conduit, or the like, hereinafter referred to collectively as "cable") and a hole in a wiring box, (commonly referred to as electrical box or junction box). In some embodiments, the cable entry device comprises a grommet (e.g., elastomeric grommet) that can be inserted into an opening in the side of a wiring box (e.g., a hole in the side of a wiring box that is intended to receive wiring). Even after a cable has been inserted through the grommet, a barrier remains between the interior atmosphere of the wiring box and the surrounding atmosphere.

In some embodiments, the cable entry device comprises a grommet and a supporting element. The supporting element can form the link between the wiring box and the grommet, while the grommet is the link between the cable and the support element. The grommet can create a barrier around the circumference of the cable and/or the periphery of the hole, while the supporting element can provide structural integrity to the grommet, preventing the grommet from being dislocated as a cable is inserted through or removed from the hole. The supporting element can attach the grommet to the wiring box and optionally prevent inadvertent cable withdrawal from the cable entry device once the cable has been inserted. In some embodiments, the supporting element, which can be designed to complement the shape of the grommet, contains shutter(s) that act as a lead-in for the entry of the cable. When pulled in a reverse direction, the shutters cinch the cable and reduce the likelihood that the cable can be inadvertently withdrawn from the wiring box. The supporting element also functions to compress the grommet to the periphery of the hole, thereby forming a barrier around the hole.

The grommet can comprise a material that has sufficient elasticity to allow the passage of a cable therethrough. Desirably, the grommet has a sufficient opening to allow the passage of the cable, while allowing the grommet to flexibly conform to the periphery of the cable so as to minimize and/or eliminating any air flow therethrough. An exemplary elastomeric material is silicone rubber. The supporting element is preferably a rigid component, such as metal or plastic. The cable entry device can be a two-piece assembly, or a one-piece assembly constructed from multi-shot molding, and can be adaptable for holes and cables of various sizes.

In an installation of a typical wiring box, the outside panels of the box are exposed to a different atmospheric environment than the inside panels of the box, while a typical cable entering the wiring box from the outside is minimally sealed. In view of the disadvantages of wasting the energy to condition air, namely the energy lost through heat transfer which is subsequently discharged into the atmosphere and the ongoing need to conserve energy where it can be conserved, the cable entry device in conjunction with additional insulation to the panels of the box, allows for said energy to be more efficiently contained in the conditioned space and to do so without significant additional labor or expense on the jobsite preferably taking full advantage of the efficiencies of manufacture.

Figure 2:
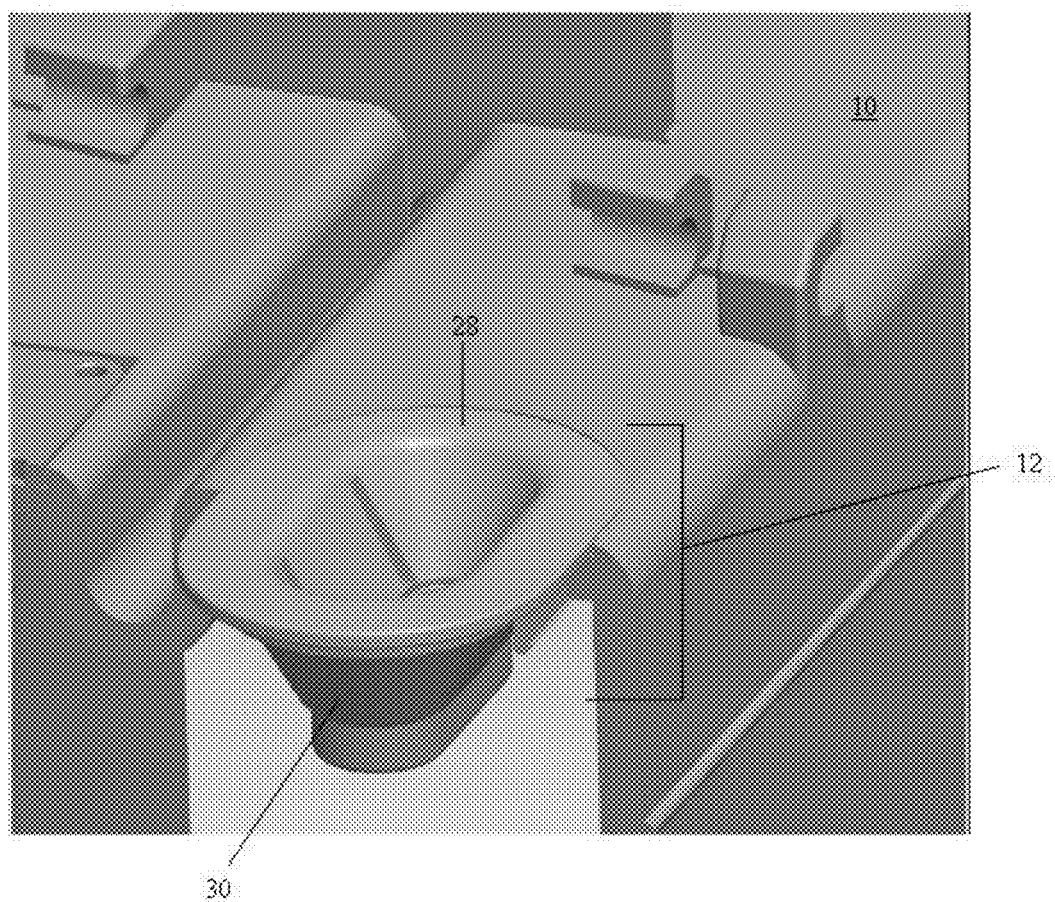
FIG. 2 is a top perspective cut-away view of an embodiment of the wiring box and cable entry device.
Figure 3:
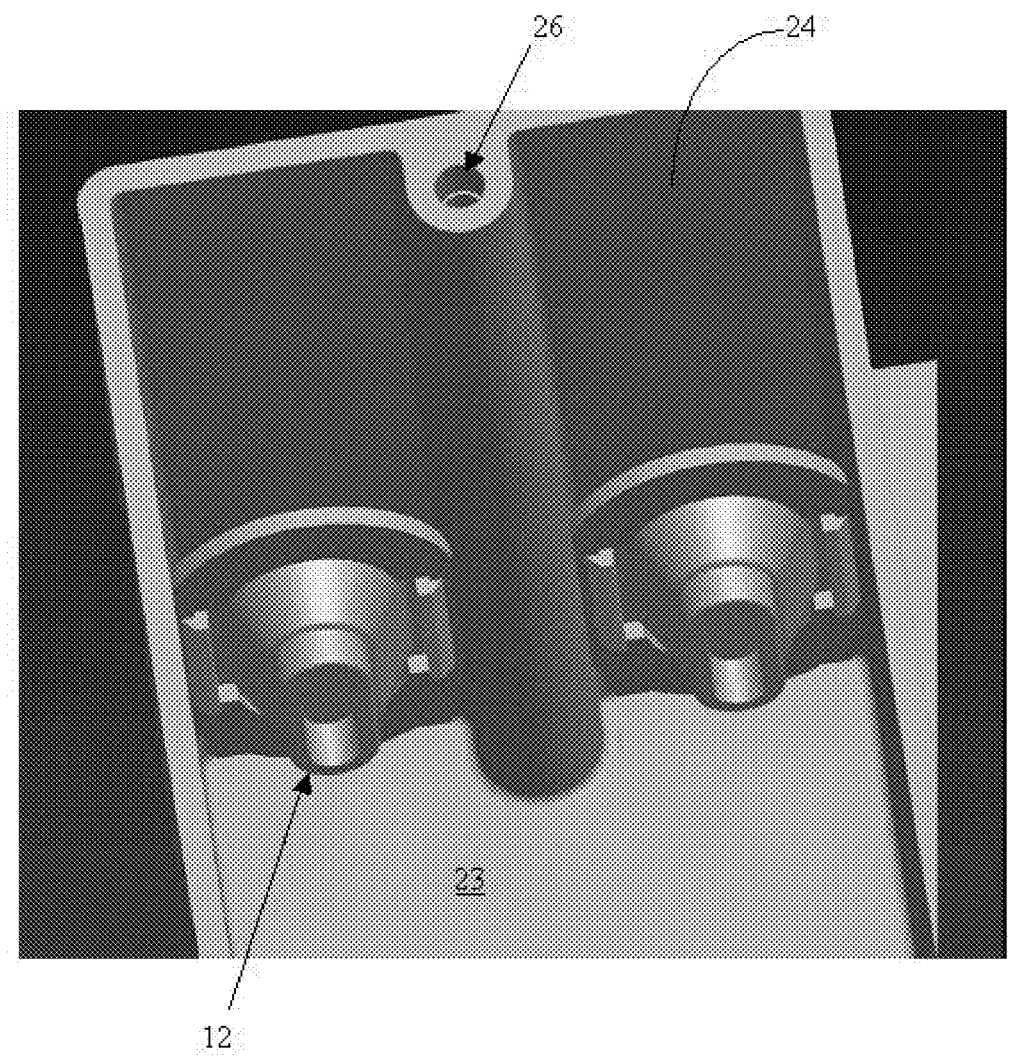
FIG. 3 is a bottom perspective view of an embodiment of the wiring box and cable entry device.

An embodiment is shown in FIGS. 1-3 comprising a wiring box 10 and a cable entry device 12. The wiring box comprises a first side 14, second side 16, top side 18, bottom side 20, front 22, and rear wall 23. Other box styles can have additional panels, shapes, and components. A wiring box usually has a cavity 24, which receives a component such as a switch, outlet, electrical receptacles, cables, and/or other structures. A bore 26 (shown in FIG. 3) can be used to receive threads of a screw in order to support and attach components within the cavity 24.

In these embodiments, cable(s) can access the cavity 24 through the cable entry device 12. After a desired cable connection and/or installation are complete, a cover plate (not shown) can be attached to the front 22 of the box 10.

FIG. 2 illustrates an exploded view of a cut-away portion of the box 10, exposing a top perspective view of the cable entry device 12. The cable entry device 12, located in a hole in the box 10, comprises support element(s) 28 and grommet(s) 30. In the illustrated embodiment, the cable entry device is oval in shape in order to accommodate an oval shaped cable such as ROMEX®(e.g., 12-3 cable, 14-2 cable, 14-3 cable, etc.) or other non-metallic sheathed electrical cables.

The specific size and geometry of the cable entry device is dependent upon the size of the hole into which it will be inserted and the size and shape of the cable that will be disposed therethrough. The cable entry device forms the bridge between the cable and the wiring box, forming a barrier to inhibit the ingress and egress of air to and from the box, through the holes. Hence, while the cable entry device can be of any shape, an inner shape that complements the shape of the wire can be useful in forming a tight fitting barrier between the grommet and cable, while an outer shape that complements the size and shape of the hole enables secure attachment of the cable entry device to the hole. Additionally, while the figures depict the cable entry device as flush with the wall of the wiring box, disposed in a recessed hole, the periphery of the cable entry device can be located in the hole and/or on the surface of the box.

Figure 4:
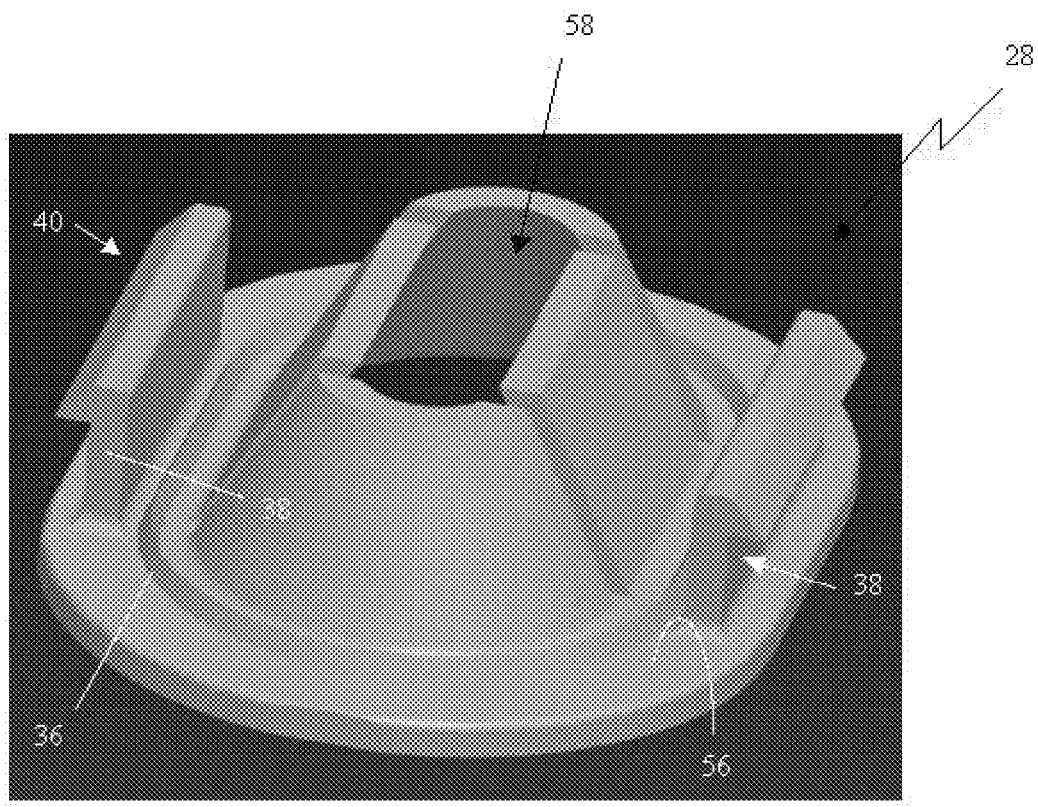
FIG. 4 is a bottom perspective view of an embodiment of the supporting element.
Figure 5:
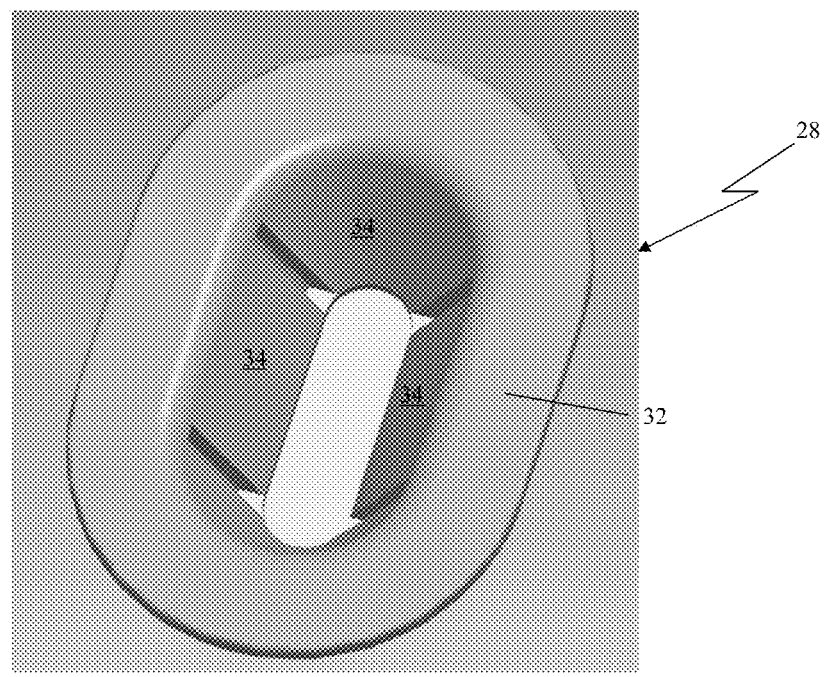
FIG. 5 is a top perspective view of an embodiment of the supporting element.
Figure 8:
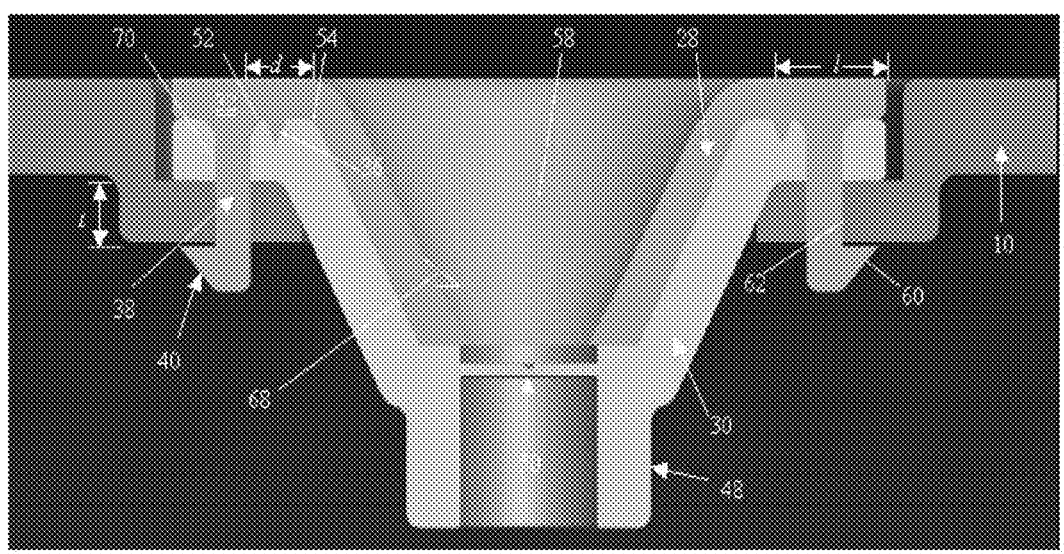
FIG. 8 is a partial cross-sectional view of an embodiment of the wiring box and cable entry device.

FIGS. 4 and 5 show bottom and top perspective views of an embodiment of the supporting element 28, respectively, while FIG. 8 illustrates a cross-sectional view of the cable entry device 12. As shown, the supporting element 28 can comprise laterally extending flange(s) 32 and shutter(s) 34. Optionally, the support element 28 can further include prong(s) 36, detent(s) 38, and/or tab(s) 40. The flange 32, which has a size and geometry to complement the opening (e.g., hole in the wiring box) so as to cover the opening and form a barrier for air ingress and egress, can provide lateral support for securing the grommet 30 to the wiring box 10. In the present illustration, the flange and the opening have an elongated (e.g., substantially oval) shape. As is clearly understood, different overall flange outer shapes are unlimited (e.g., square and rectangular shapes are illustrated in FIG. 10). Desirably, the opening shape is complementary with the wire outer shape.

The support element 28 can be secured to the box such that the shutter(s) 34 extend into the hole while the flange 32 extends around the periphery of the hole. The support element can be secured to the box by various connectors, e.g., a weld, bond, rivet(s), adhesive, snap-fit connector(s), compression fit, and tab(s), as well as combinations comprising at least one of the foregoing. The securement to the box can be removable (e.g., such that the support element can be removed from the box without damage to the support element or the box) or permanent (e.g., not capable of being removed from the box without damage to the support element and/or the box). In various embodiments, to securely maintain the cable entry device 12 in the desired location in the box (such as a first side, a second side, a top side, a bottom side, and rear wall), the device can comprise a stop (e.g., a flange) and a grip (e.g., the detent and tab). For example, the support element 28 can snap-fit into the hole via detent(s) 38 and tab(s) 40. The detent 38 extends from a second side from the flange 32. The length of the detent 38 is dependent upon the particular cable entry device 12 design. In the embodiments where the grip extends through the grommet 30, the detent length depends upon the thickness of the grommet rim 42 and the thickness of the box wall at the hole periphery "t" (e.g., see FIG. 8). However, if the grommet rim 42 will not be located between the flange 32 and the box wall, the detent length will depend upon the thickness of the box wall at the hole periphery "t" (e.g., see FIG. 6). The length should be sufficient to attach the support element 28 to the box with the rim 42 located between the flange 32 and the hole periphery. For example, the length of the detent 38 from the flange 32 to the tab 40 can be the combined thickness of the compressed rim 42 and the thickness of the box wall at hole periphery where the tab(s) will engage the periphery (e.g., less than the thickness of the rim 42 plus the thickness of the box wall at hole periphery "t"). It should be noted, if the hole has a recessed area to receive the cable entry device 12, the thickness of the box at the hole periphery "t" can be less than the thickness of the remainder of the box.

The tab(s) extend from the detent, away from the opening 58 a sufficient distance to engage the interior of the box at the hole periphery and secure the support element 28 to the box. The tab(s) 40 can have an angled side 60 that enables facile insertion of the support element 28 into the hole by exerting pressure on the angled side 60, causing the detent to flex toward the opening 58, thereby decreasing the outer diameter of the tab 40 and allowing the tab to pass the edge of the hole 62 and snap into place. (See FIG. 8) Alternatively, or in addition to the tab(s), the cable entry device (e.g., the support element 28) can be designed to attach to the box in other manners (e.g., other snap-fit connections, adhesive, bonding, and/or thermal welding, etc.) and/or designed to be inserted into the box hole from the inside of the box (e.g., using adhesive, thermal welding, and/or a snap-fit connection, or the like). When the snap-fit and similar type connections are used, the cable entry device is removable from the box and therefore replaceable as needed or desired.

The stop (e.g., the flange) can additionally or alternatively comprise a retention element configured to engage the grommet 30. For example, prong(s) 36 (e.g., a ridge that extends around the flange), can protrude from the second side of the flange to further grasp, compress, and/or retain the grommet 30 in position (e.g., exert greater compression on a portion of the grommet 30 than the remainder of the flange 32 when the cable entry device 12 is installed in a box). Prong(s) can be located between the detent and the shutters and/or between the detent and the outer edge of the flange 32 (away from the opening 58). The supporting element optionally contains a ridge 36 positioned in between the detents 38 and the shutters 34. The detents 38 are connected to the flange 32 at one end thereof, and extend substantially perpendicular to the laterally extending flange 32 and terminate at the tab(s) 40.

The supporting element 28 comprises one more shutter(s) 34 that extend from the stop (e.g., the flange 32). These shutter(s) can be configured such that the opening 58 converges away from the flange. In order to enable facile insertion of various sized cables, the shutter(s) can be cantilevered such that they can deflect outward during the insertion of a cable. The shutter(s) 34 provide strain relief for a cable that enters through the supporting element 28. When a cable has been inserted through the supporting element 28, the shutter(s) 34 will abut and/or cinch the cable. Optionally, the shutter(s) 34 can comprise protrusion(s) 68 that allow the insertion of a cable, but resist the removal of the cable. For example, pulling the cable in the reverse direction (i.e., out of the cable entry device 12) will cause the protrusions to engage and grip the cable.

The shutters 34 of the supporting element 28 are designed to guide a cable entering the cable entry device towards the grommet diaphragm 46, e.g., while protecting the sidewalls 44 and lips 48 from being punctured by the cable. In the embodiment shown, grommet 30 (e.g., the diaphragm 46 and/or lips 48) create a barrier around the perimeter of the cable when the cable is inserted into the cable entry device 12, thereby inhibiting ingress and egress of air at the entry point of the cable.

The supporting element can be made of a material with sufficient structural integrity to securely attach to the wiring box, withstand the insertion of a cable, and retain the grommet. For example, a rigid material, such as a plastic (e.g., thermoplastic, thermoset, and/or elastomeric material) and/or a metal that has sufficient structural integrity for the particular use. Exemplary supporting element materials include polycarbonate, nylon, polyolefin, esters (e.g., vinyl ester), ABS, as well as combinations comprising at least one of the foregoing materials.

Figure 6:
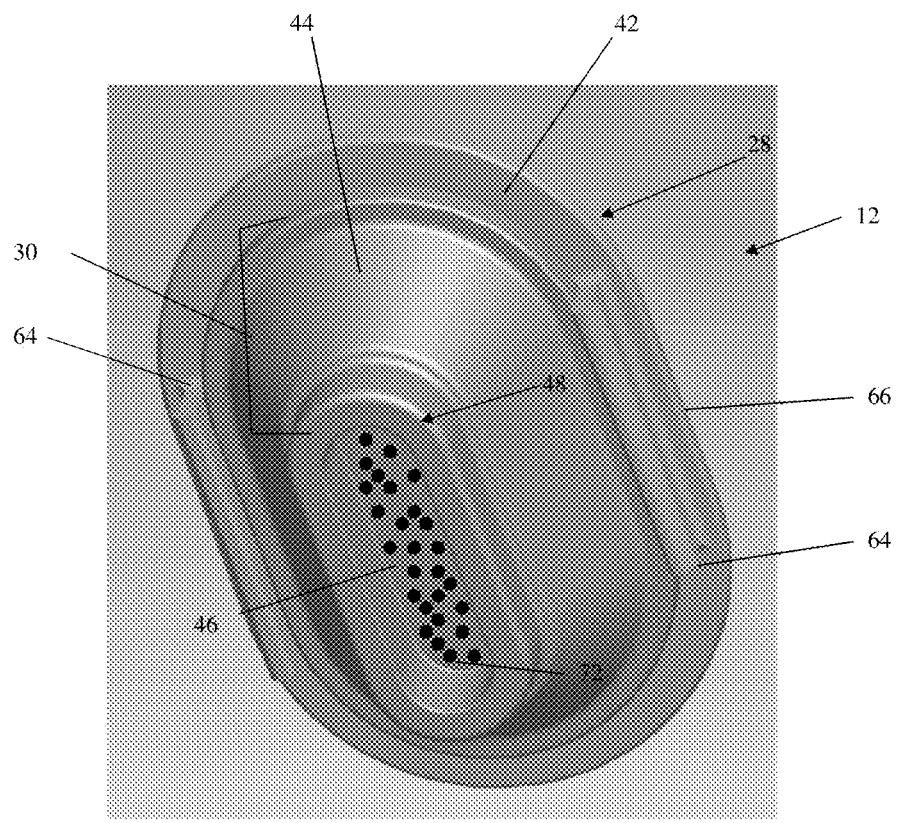
FIG. 6 is a bottom perspective view of an embodiment of the cable entry device.

FIG. 6 illustrates the grommet 30 in communication with the supporting element 28 (e.g., in contact with the second surface of the support element 28 so as to enable the grommet 30 to be disposed between the support element 28 and the box). The grommet 30 has a shape that complements the supporting element 28 (e.g., a shape that can mate with the support element 28 and form a seal between the support element 28 and the box to inhibit air ingress and egress at the joint of the support element and the box). The grommet 30 comprises a rim 42, sidewall 44, and diaphragm 46. As shown, the rim 42 can laterally extend to complement the flange 32, e.g., has a sufficient inner diameter to extend around the shutters 34 where the shutters 34 meet the flange 32, e.g., at point 54. The rim 42 can extend from the sidewall 44 a sufficient distance to attain the desired seal between the support element 28 and the box and/or a sufficient distance such that the grommet 30 can be securely attached to the support element 28 (e.g., attached to the support element 28 such that the grommet 30 is not dislodged from the support element 28 and/or the box during insertion and/or removal of cable(s)). For example, if the flange 32 comprises prong(s) 36, the rim 42 can extend away from the sidewall 44 (e.g., can extend outward from sidewall 44) such that the rim has a length "l" that is greater than the distance "d" from an outer point 52 of the prong(s) 36 to the point 54 where the shutter(s) 34 meet the flange 32. (See FIG. 8) Optionally, the rim 42 and the flange 32 can have the same outer diameter.

Figure 7:
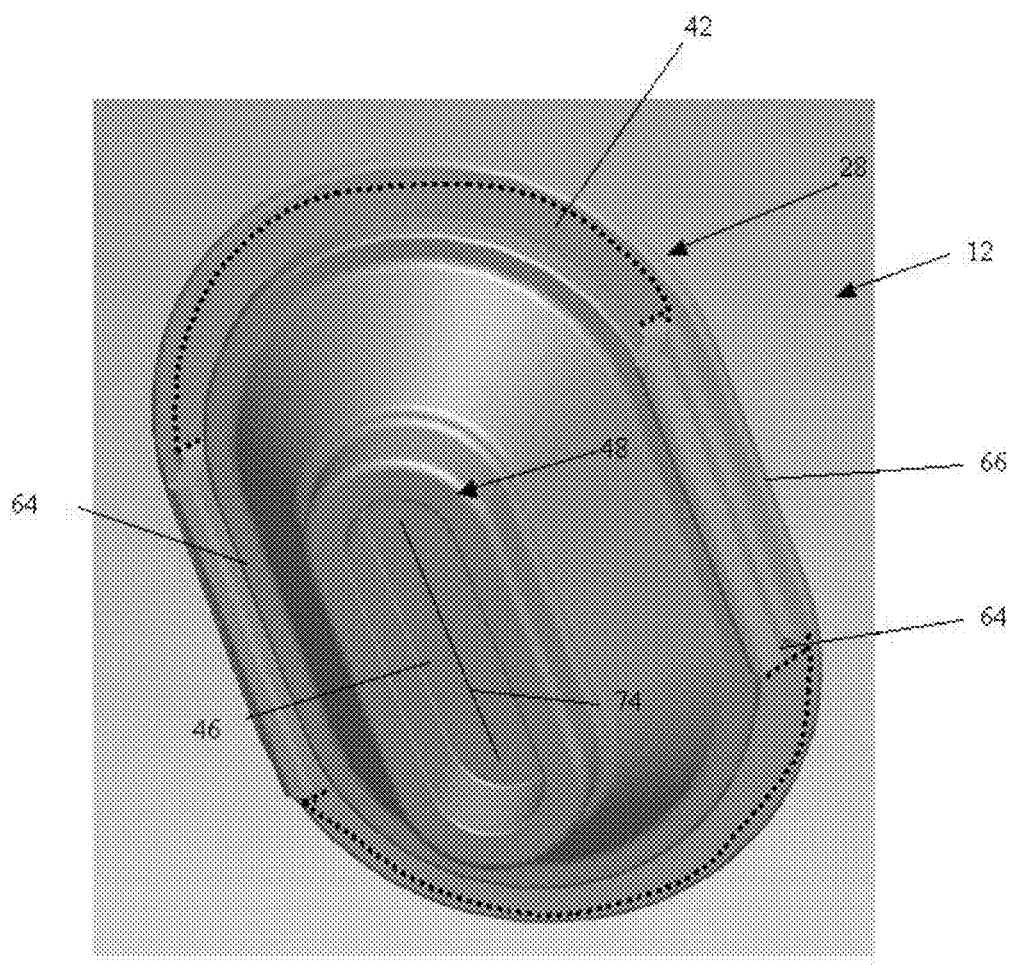
FIG. 7 is a bottom perspective view of an embodiment of the cable entry device.

When the support element 28 will be secured to the box via a grip that extends from a second side of the flange, the grommet 30 can comprise a notch 64 to accommodate the grip or a slit 70 so that the grip can extend through the rim 42 when the cable entry device 12 is attached to a box. (See FIGS. 7 and 8) In FIG. 7, the dotted line is intended to illustrate another embodiment of the grommet, wherein the grommet rim extends beyond the detent 38 toward the edge of the rim 42, thereby illustrating the notch 64 in the grommet to accommodate the detents 38. Alternatively, the grip can be designed to pierce through the grommet without a predefined slit, e.g., with optional perforations or fatigued area. For example, a notch 64 in the rim 42 can have a size to enable the attachment of the grommet 30 to the support element 28 such that the grip is located in the notch 64. For example, the rim 42 extends around the flange 32, except in the area of the detent 38 and between the detent 38 and the flange periphery 66. When the grip is disposed through the grommet 30 (e.g., through the rim 42), the grommet has an opening (e.g., slit 70) that enables the grip to be inserted through the opening. Desirably, the opening is sufficiently small so as to form a barrier around the grip to prevent air flow between the grip (e.g., detent) and the grommet.

The sidewalls 44 of the grommet 30 extend from the rim 42. This sidewall 44 can complement the shape of the shutters 34, e.g., converging away from the rim 42 toward the diaphragm 46, e.g., at a rate similar to the convergence of the shutters 34 away from the flange 32. When attached to a wiring box, the sidewall 44 extends axially downward into the cavity of the wiring box. The sidewall can enclose spaces created in between the shutters 34 themselves and between the shutters and any cable inserted through the cable entry device.

The sidewall 44 extends from the rim 42 to a diaphragm 46. The diaphragm can be designed to complement the perimeter of an intended cable to be inserted into the cable entry device so as to create a tight fitting barrier between the cable and the device. The diaphragm 46 can extend across the opening 58 at the end of the sidewall 44 opposite the rim 42. In an embodiment, the diaphragm is puncturable such that the cable can puncture the diaphragm 46 upon insertion. Optionally, the diaphragm 46 comprises an entrance location 50 (e.g., perforation(s) 72 and/or slit(s) 74) (see FIGS. 1, 6, and 7) to allow the facile insertion of the cable through the diaphragm 46. Optionally, a wiring box to be designed for multiple cable entry devices, e.g., for optional use at a later time. In this case, an unpunctured diaphragm 46 will maintain a barrier between the interior and exterior of the wiring box.

The diaphragm 46, which can have a different thickness than other portions of the grommet 30, can have sufficient structural integrity to receive the cable without the cable dislodging pieces of the diaphragm from the grommet 30 (e.g., tearing off pieces of the diaphragm).

Optionally, lip(s) 48 can extend from the sidewall 44 and encompass the perimeter of the diaphragm 46. When the entrance location is penetrated, the lips 48 can provide structural integrity to the diaphragm 46 so as to prevent portions of the diaphragm 46, tearing and/or extending, for example, to the sidewalls. Further the lips can be flexible, pliable, and/or shaped to conform to the perimeter of an intended cable to be passed therethrough, so as to provide an additional air barrier around the cable. The lip(s) 48 can form a single, contiguous rim around the diaphragm 46, or can be multiple lips 48 (e.g., that overlap one another), to form a rim around the diaphragm 46. The lip 48 can extend from the sidewall 44, coaxially with the opening 58 and parallel to that axis, or the lips can converge toward the axis to further inhibit airflow around the wires.

The grommet can be made of an elastomeric material (e.g., a flexible, resilient material), such as rubber. Some exemplary materials include silicone rubber, natural rubber, butyl rubber, isoprene, EPDM, nitrile, neoprene, polyacrylate, silicone, plastomers, as well as combinations comprising at least one of the foregoing materials. Desirably, the material(s) of the grommet and support element meet fire rating standards for the particular application.

FIG. 8 is a cross-sectional view of the cable entry device 12 attached to the wiring box 10. This figure shows in more detail the communication between the supporting element 28, grommet 30, and the periphery of the wiring box 10. Ridge 36 of the supporting element 28 grips the grommet 30 and holds the grommet in place while it is compressed by the locking force between the flange 32 and, in some locations, the perimeter of the hole of the wiring box 10.

FIGS. 9 and 10 are different views of another embodiment of a wiring box. This wiring box comprises multiple cable entry devices. It is noted that 4 devices are illustrated on one side of the box with openings for four more on the other side of the box. (See FIG. 9) However, the wiring box can have any desirable number of cable entry devices, depending upon the specific use of the wiring box. For example, the box can comprise greater than or equal to 2 cable entry devices, specifically, greater than or equal to 4 cable entry devices, more specifically, 4 to 30 cable entry devices, and yet more specifically 6 to 20 cable entry devices.

It is also noted that the cable entry devices illustrated in these figure have a flange 136 with an overall rectangular geometry, with multiple openings 58 (two are illustrated, but more are possible).

As is illustrated in these figures, the cable entry device(s) 12 can be located in openings 100 disposed through a side of the wiring box 110, optionally, the openings 100 in the wiring box 110 can be in sloping surface 112 of the side of the box. In other words, the surface 112 meets the rear 23 at an angle of other than 90 degrees. In the embodiment illustrated, the rear meets the side at an angle 114 of greater than 90 degrees such that the sloping surface 112 slopes away from the rear 23. Optionally, the sloping surface can extend to the rim 82, or can end at the junction with perpendicular surface 116, which is oriented perpendicular to rear 23, and which extends from the sloping surface 112 to the rim 82.

The optional rim 82 can be located on 2 or more sides of any of the embodiments of the wiring box. The rim 82, which extends outward at an angle parallel to the rear 23, can assist in locating the wiring box in a wall. The rim 82 can be located on perpendicular surface 116 or at the intersection of perpendicular surface 116 and sloping surface 112.

Also extending from sides of the wiring box can be connector(s) 78 and attachment element(s) 76. As with the optional rim 82, the connector(s) and attachment element(s) as well as the other components disclosed in specific embodiments hereof, can be employed in the various embodiments. The attachment element 76 is located through the connector 78 within a channel 80. Although the attachment element 76 can be oriented parallel to the side of the wiring box on which it is located, it is generally oriented at a non-parallel angle, (e.g., angle θ between the sidewall and the attachment element 76 is greater than zero and less than 90 degrees, specifically, 15 degrees to 75 degrees, more specifically, 15 degrees to 45 degrees), for example, to enhance the accessibility of the head 84 of the attachment element 76, and/or to cause the wiring box to be drawn toward the stud when the attachment element 76 is inserted into the stud.

In addition or alternatively to the attachment element non-parallel angle with respect to the side, the attachment element 76 can be angled parallel or non-parallel with respect to the rear 23. For example, angle Φ can be greater than zero and less than 90 degrees, specifically, 15 degrees to 75 degrees, more specifically, 15 degrees to 45 degrees.

The connector 78 can extend from opposing sides of the wiring box. Disposed through the connector 78 is the channel 80 at the desired non-parallel angle of the attachment element 76. The channel 80 can have open or closed sides. If there is an opening in a side of the channel 80 (e.g., opening 86), the channel 80 will comprise bridge portion(s) 88 across the channel 80 so that the attachment element 76 is enclosed in at least one area, desirably two or more areas.

The cable entry device 12 can be formed using various manufacturing techniques such as molding (e.g., multi-shot molding, over-molding, injection molding, etc.). In some embodiments, the support element can be premolded into the wiring box. It is also envisioned that the supporting element can be made of more than one part, such that an assembly of the parts allows the overall size of the supporting element (e.g., the flange circumference) to be adjustable thereby enabling its use in various hole sizes. For example, the shutters can be a separate element configured to be disposed in various sized flanges for use in different size holes.

For example, in a typical multi-shot process, the object to be molded is made from more than one material. A first material is injected into a first mold to form a first molded object. The first molded object is then removed from the first mold, and inserted into a second mold, typically by rotating the movable portion of the mold from the first mold to the second mold, into which a second material to be molded is injected to form the final molded object. The final molded object is thus a combination, e.g., laminate, of the first and second materials. Additional analogous molding steps using third, fourth and additional materials can also be employed. These steps can all occur within the same molding cycle.

Using a multi-shot mold, the plastic forming the supporting element can be injected into a mold. Once formed, the supporting element can be placed into a second mold where the elastomer can be injected over the supporting element, forming the grommet for the cable entry device. Desirably, the second overmolding of the elastomer can occur within a reasonable time subsequent to the first molding of the supporting element, so that the elastomer bonds to the underlying supporting element and form a single unit.

In one embodiment, the wiring box can comprise: a cavity formed by walls having an internal surface inside the cavity and an external surface; and a cable entry device disposed through a hole in a first wall of the walls. The cable entry device can comprise: a support element that retains a grommet in the hole, wherein the support element comprises a stop, a grip extending from the stop, and shutters extending from the stop and defining an opening, wherein the opening converges away from the stop, the grip attaches the support element to the first wall, and wherein the grommet comprises a rim, a sidewall extending from the rim and converging toward a diaphragm.

In one embodiment, a cable entry device can comprise: a support element and a grommet. The support element can comprise a stop, a grip extending from the stop, and shutters extending from the stop and defining an opening, wherein the opening converges away from the stop. The grommet can comprise a sidewall extending from a rim and surrounding the shutters, wherein the sidewall converging toward a diaphragm.

In the various embodiments disclosed herein, (i) the side wall can be located around the shutters such that the rim is located between the stop and the wall; and/or (ii) the stop can be a flange that extends away from the cavity and engages the external surface of the first wall; and/or (iii) the diaphragm can comprise perforations and/or a slit; and/or (iv) the grip can extend through the rim, into the cavity, and engages the internal surface of the first wall; and/or (v) the shutters can further comprise a protrusion extending toward the cavity; and/or (vi) the diaphragm can be puncturable; and/or (vii) the grip can further comprise a detent extending from the stop through the hole, and a tab extending from the detent away from the opening so as to engage the interior surface of the wall; and/or (viii) the grommet can be formed from an elastomeric material and the supporting element is formed from a plastic; and/or (ix) the cable entry device can be removable from the wall; and/or (x) the grommet and supporting element can be a unitary molded piece (e.g., inseparable, not merely assembled components); and/or (xi) the first wall comprises a sloped surface extending from a rear wall to a perpendicular surface, and wherein the cable entry device is disposed in the sloped surface; and/or (xii) the wiring box further comprises a connector extending from the first wall, wherein the connector comprises an attachment element located in a channel extending through the connector; and/or (xiii) the wiring box comprises multiple cable entry devices in the first wall and in an opposing second wall.

As shown in the embodiments, the cable entry device comprises a molding of two different unitary components that are compressed and locked together on a wiring box. Alternatively, it is envisioned that a single, multifunctional component capable of providing the structural integrity and the barrier functionality can be formed, e.g., via the multishot injection molding process.

It is also understood that the present cable entry device can be employed in various boxes, including standard wiring boxes comprising knock-outs, can be retrofitted into existing boxes, and can be used in energy efficient boxes. For example, the cable entry device can be used in the boxes disclosed in U.S. Patent Publication Nos. 2009/0114413 A1 and 2009/0188916 A1 to Daviau.

In the embodiments shown, the cable entry device is substantially oval in shape along the lateral surface of the wiring box, and has somewhat of an oval cone shape that extends axially into the cavity of the wiring box. It is envisioned that the cable entry device can be of any a polygonal or rounded shape, along as it can engage the wiring box and perform its function as described herein. Also, any number of detents, shutters, lips, or other features described herein, is possible.

As stated above, the cable entry device is a simple and cost effective element that enables the production of energy efficient wiring boxes, e.g., boxes with reduced air transfer, even around the cables. This cable entry device improves upon insulation techniques of wiring boxes and minimizes air transfer at the point of entry of cables into a wiring box without significant additional installation labor.

While the embodiments described herein utilized a wiring box, the cable entry device is not limited to this single application, it is also applicable to holes of many other applications including electrical control cubicles, instrument housings, household appliances, cable entries in walls, conduit entries etc.

Also, for simplicity, reference has been made to a "cable", which is not intended to limit the scope of the invention. As is understood, the invention can equally be used with, for example, a conduit for conducting fluids and conduits that can be extended through openings in floor or other panels, especially where it is desired to restrict the flow of air through such openings. The scope of the invention is best defined of the appended independent claim.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. All cited patents, patent applications, and other references are incorporated herein by reference in their entirety. However, if a term in the present application contradicts or conflicts with a term in the incorporated reference, the term from the present application takes precedence over the conflicting term from the incorporated reference.

What is claimed is:

1. A wiring box, comprising
a cavity formed by a plurality of walls having an internal surface inside the cavity and an external surface, wherein the walls comprise a first side, a second side, a top side, a bottom side, and a rear wall; and
a cable entry device disposed through a hole in any one of the walls, wherein the cable entry device comprises
a support element that retains a grommet in the hole;
wherein the support element comprises a flange, a grip extending from the flange, and shutters extending from the flange and defining an opening, wherein the opening converges away from the flange, the grip attaches the support element to any one of the walls, wherein the grip comprises a detent; and
wherein the grommet comprises a rim, a sidewall extending from the rim and converging toward a diaphragm; and
wherein a size and a shape of the cable entry device is based upon a size and a shape of the hole.

2. The wiring box of claim 1, wherein the side wall is located around the shutters such that the rim is located between the flange and at least one of the walls of the cavity.

3. The wiring box of claim 1, wherein the flange extends away from the cavity and engages the external surface of any one of the walls.

4. The wiring box of claim 1, wherein the diaphragm comprises perforations or a slit.

5. The wiring box of claim 1, wherein the grip extends through the rim, into the cavity, and engages the internal surface of any one of the walls.

6. The wiring box of claim 1, wherein the shutters further comprise a protrusion extending toward the cavity.

7. The wiring box of claim 1, wherein the diaphragm is puncturable.

8. The wiring box of claim 1, wherein the detent extends from the flange through the hole, and a tab extending from the detent away from the opening so as to engage the interior surface of any one of the walls.

9. The wiring box of claim 1, wherein the grommet is formed from an elastomeric material and the supporting element is formed from a plastic.

10. The wiring box of claim 1, wherein the cable entry device is removable.

11. The wiring box of claim 1, wherein the grommet and supporting element are a unitary molded piece.

12. The wiring box of claim 1, wherein at least one of the first side, the second side, the top side, and the bottom side comprises a sloped surface extending from the rear wall to a perpendicular surface, and wherein the cable entry device is disposed in the sloped surface.

13. The wiring box of claim 1, further comprising a connector extending from any one of the walls, wherein the connector comprises an attachment element located in a channel extending through the connector.

14. The wiring box of claim 1, comprising multiple cable entry devices in at least two of the walls that oppose each other.

15. A cable entry device, comprising:
a support element and a grommet;
wherein the support element comprises a flange, a grip extending from the flange, and shutters extending from the flange and defining an opening, wherein the opening converges away from the flange; and
wherein the grommet comprises a sidewall extending from a rim and surrounding the shutters, wherein the sidewall converging toward a diaphragm; and
wherein the grip comprises a detent; and
wherein the cable entry device is configured to be used in a hole in a wiring box, wherein the wiring box has a plurality of walls comprising a first side, a second side, a top side, a bottom side, and a rear wall and wherein a size and a shape of the cable entry device is based upon a size and a shape of the hole.

* * * * *